(12) United States Patent
Hahn et al.

(10) Patent No.: US 7,855,628 B2
(45) Date of Patent: Dec. 21, 2010

(54) MAGNET POLE FOR MAGNETIC LEVITATION VEHICLES

(75) Inventors: Wolfgang Hahn, Kassel (DE); Qinghua Zheng, Taufkirchen (DE)

(73) Assignee: ThyssenKrupp Transrapid GmbH, Kassel (DE)

( * ) Notice: Subject to any disclaimer, the term of this patent is extended or adjusted under 35 U.S.C. 154(b) by 924 days.

(21) Appl. No.: 10/584,899

(22) PCT Filed: Feb. 4, 2005

(86) PCT No.: PCT/DE2005/000183

§ 371 (c)(1),
(2), (4) Date: Jun. 28, 2006

(87) PCT Pub. No.: WO2005/087532

PCT Pub. Date: Sep. 22, 2005

(65) Prior Publication Data

US 2008/0143467 A1 Jun. 19, 2008

(30) Foreign Application Priority Data

Mar. 9, 2004 (DE) .................. 10 2004 011 940

(51) Int. Cl.
*H01F 27/30* (2006.01)
(52) U.S. Cl. ...................................... 336/206
(58) Field of Classification Search .......... 336/65, 336/180–186, 192, 206–208, 220–223
See application file for complete search history.

(56) References Cited

U.S. PATENT DOCUMENTS

| 2,521,513 | A | * | 9/1950 | Gray ........................... 323/355 |
| 2,529,653 | A | * | 11/1950 | Epstein ........................ 336/192 |
| 3,086,184 | A | * | 4/1963 | Nichols ........................ 336/60 |
| 3,195,088 | A | * | 7/1965 | Sandoz ........................ 336/180 |
| 3,593,243 | A | * | 7/1971 | Trump et al. .................. 336/60 |
| 4,086,552 | A | * | 4/1978 | Baggermans ................ 336/119 |
| 2001/0001895 | A1 | | 5/2001 | Setiabudi et al. | |

FOREIGN PATENT DOCUMENTS

| DE | 24 42 388 | 3/1976 |
| EP | 0 472 197 | 2/1992 |
| JP | 06290933 | 10/1994 |
| JP | 11196546 | 7/1999 |
| WO | 97/30504 | 8/1997 |

\* cited by examiner

*Primary Examiner*—Tuyen Nguyen
(74) *Attorney, Agent, or Firm*—Michael J. Striker

(57) ABSTRACT

A magnetic pole comprised of a core (301) and a winding (314) for magnetically levitated vehicles is described. According to the present invention, the winding (314) is comprised of at least two discs (315, 316) that consist of conductor strips wound in several layers around said core (301). The individual layers are electrically insulated by way of first insulation layers (303, 310, 321) radially against each other and against said core (301), while the individual discs (315, 316) are electrically insulated against each other axially by at least a second insulation layer (317).

8 Claims, 3 Drawing Sheets

MAGNET POLE FOR MAGNETIC LEVITATION VEHICLES

CROSS-REFERENCE TO RELATED APPLICATION

The invention described and claimed hereinbelow is also described in German patent Application DE 10 2004 011 940.6 filed on Mar. 9, 2004. This German Patent Application, whose subject matter is incorporated here by reference, provides the basis for a claim of priority of invention under 35 U.S.C. 119(a)-(d).

BACKGROUND OF THE INVENTION

The present invention relates to a magnet pole.

Magnet poles of this type are used with magnetically levitated vehicles in various applications, e.g. as parts of carrier, guidance, or brake magnets. Up to now, these magnet poles have been made of an iron core and a winding applied on it, said winding being formed of layers of a conductor and an isolator arranged in alternating succession (PCT WO 97/30 504). The conductors and isolators are comprised of band-shaped materials, e.g. aluminum bands and thin insulating foils.

Prior art magnet poles are comprised of one disk each so that the number of layers is equal to the number of windings. If the number of windings is high, this arrangement involves a problem in cooling. If the core is to simultaneously act as a cooling element, the heat generated in each layer is also required to penetrate in radial direction through electrically desired, though thermally interfering, insulation foils, the overall thermal resistance of which steadily increases as the number of layers rises.

SUMMARY OF THE INVENTION

Now, therefore, it is the object of the present invention to propose a configuration for the magnet pole of the species outlined hereinabove that improves heat discharge without any significant adverse effect upon electromagnetic characteristics or on the space taken by said magnet pole.

In keeping with these objects and with others which will become apparent hereinafter, one feature of the present invention resides, briefly stated, in a magnetic pole for magnetic levitation vehicles, comprising: a core (301) acting as a cooling element; a winding (314) applied on said core (301), said winding (314) having at least two discs (315, 316) formed by conductor strips (306) wound in several individual layers (1 . . . 300) around said core (301); first insulation layers (310, 321) for electrically insulating said individual layers (1 . . . 300) radially against each other and against said core (301); and at least a second insulation layer (317) lying between said at least two discs (315, 316) for electrically insulating said discs (315, 316) axially against each other.

Applying a magnet pole with two disks according to the present invention, the heat flow only needs to penetrate through a correspondingly lower number of electrical insulation layers in radial direction if the same number of windings, though distributed on both sides is provided. While all the other conditions are the same in terms of the overall number of windings, maximum terminal voltage, and space taken by said magnet pole, a notably better cooling efficiency is thereby achieved.

BRIEF DESCRIPTION OF THE DRAWINGS

Embodiments of the present invention will be explained hereinafter in more detail and based upon the drawings attached hereto, in which.

DESCRIPTION OF THE PREFERRED EMBODIMENTS

Figure 1:
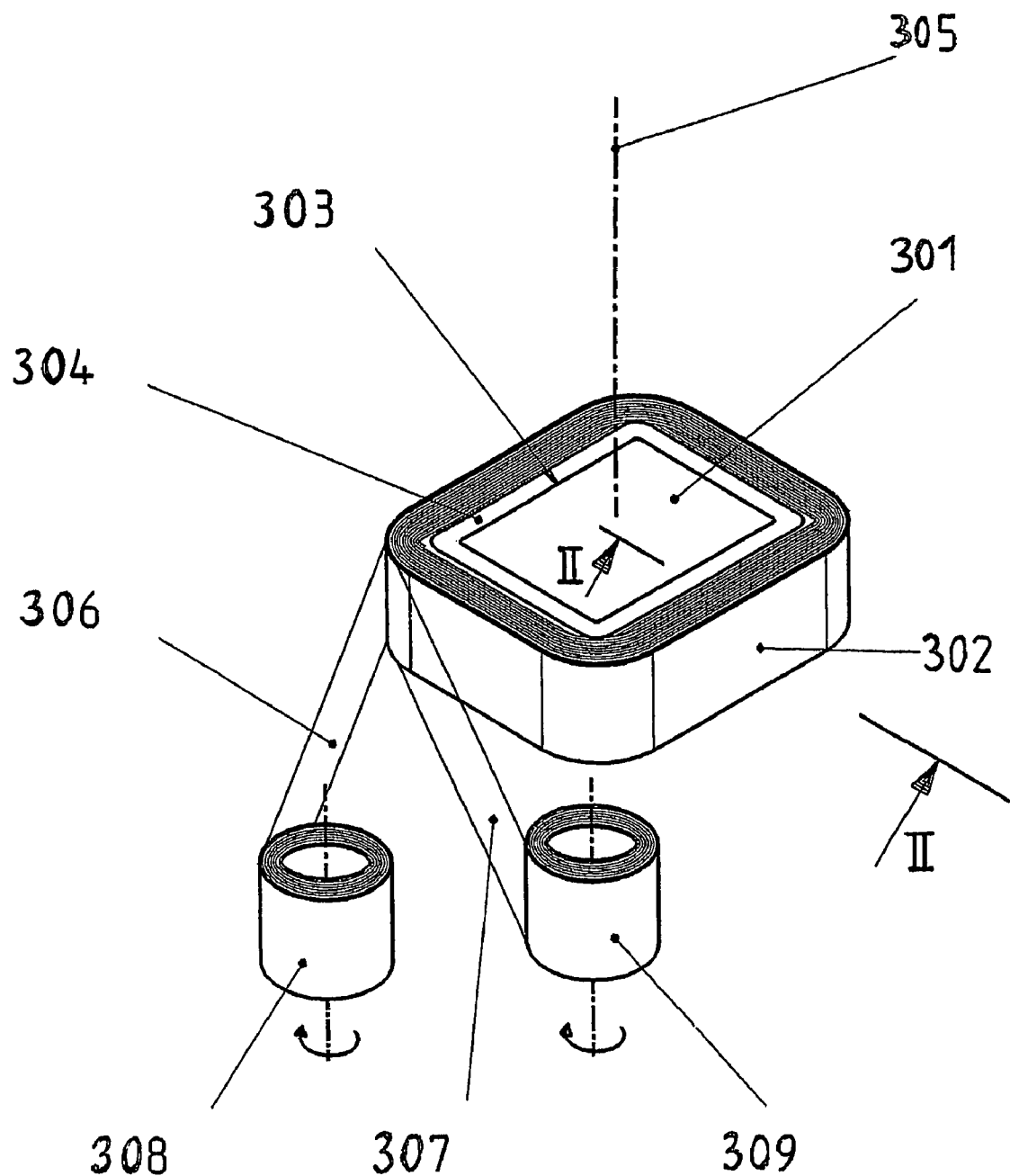
FIG. 1 shows a perspective view of winding a magnet pole for magnetically levitated vehicles, said magnet pole comprising a usual mono-disk winding.

A magnet pole of the type being of interest hereunder according to FIG. 1 is comprised of an iron core 301 consisting of a metal sheet pack, preferably square-shaped, with rounded-off corners and a winding 302 applied on it. The production of said core 301 can be done in many different ways and is of no importance for the present invention. Moreover, said core 301 can be provided with a circumferential winding carrier 303 lying against its shell surface, said winding carrier being comprised of an insulating material, e.g. made of plastic, and provided with assembly flanges 304 in between of which winding 302 comes to lie. Thus, said winding carrier 303 serves for both assembly of said winding 302 and electrical insulation of said winding 302 towards said core 301 in radial direction relative to a center and winding axis 305 of said core 301.

For example, the winding 302 is formed of alternatively succeeding layers of a conductor strip 306 (e.g. made of aluminum) arranged in alternating succession and of first insulation layers 307 arranged between them in the form of an insulating foil or the like which electrically insulates these layers against each other in a radial direction. In manufacturing said magnet pole 301, the conductor strips 306 and the insulation layers 307 are reeled-off in a well-known manner from supply coils 308, 309 and wound coaxially around the center axis 305 onto said core 301. Henceforth, the winding 302 thus obtained is comprised of a disc running coaxially to the center axis 305 and having a multitude of layers in radial direction.

Figure 2:
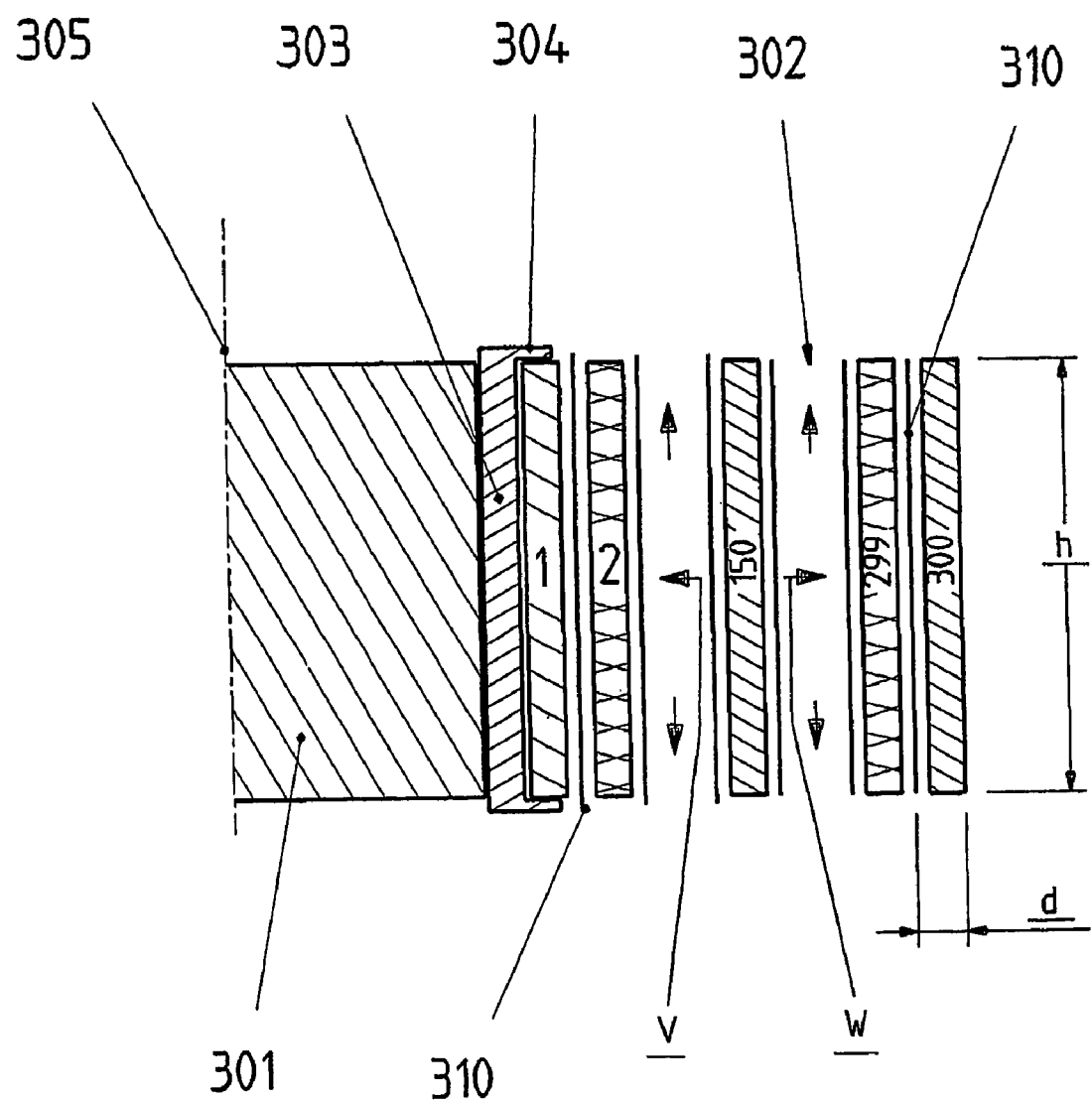
FIG. 2 shows a schematic view of heat flows in a magnet pole according to FIG. 1 during its use.

For example, magnet poles of the type described hereunder for magnetically levitated vehicles have up to 300 layers that are schematically designated by reference numbers 1 . . . 300 in FIG. 2. Therefore, the heat generated in operation, inasmuch as it is generated in a central layer, e.g. in layer 150 of winding 302, must penetrate both in a radial direction inwardly towards said core 301 and in radial direction outwardly as shown by arrows v and/or w through a multitude of insulation layers 310, e.g. 150 layers, merely shown by lines in FIG. 2 and being required to have a certain minimum thickness to ensure electrical insulation. Heat discharge and, thereby, the cooling efficiency in radial direction, therefore, notably depends on the number of existing layers 1 . . . 300.

Figure 3:
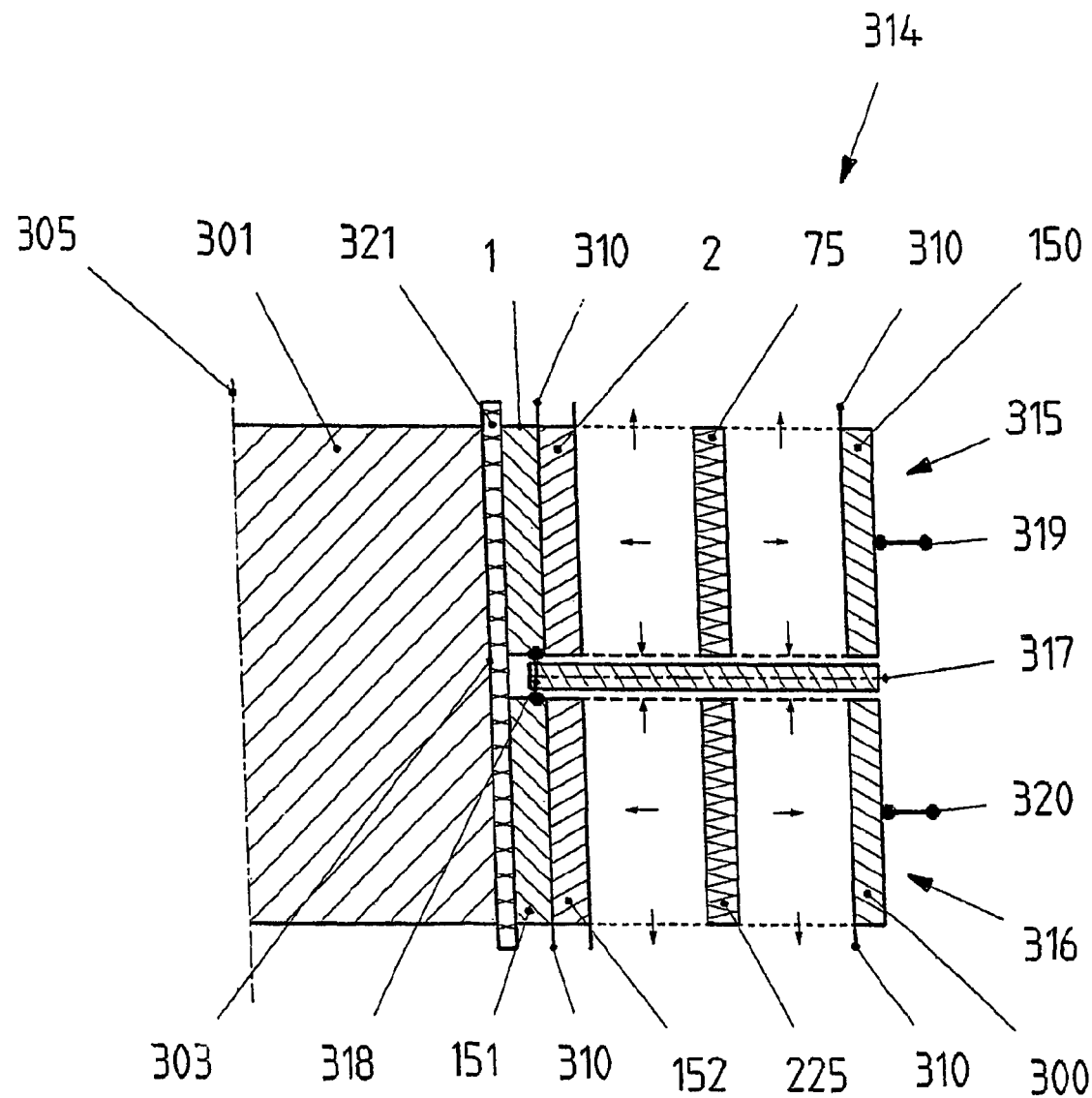
FIG. 3 shows a schematic longitudinal section along line III-III of FIG. 1 through half of a magnet pole, but with a configuration as set out in the present invention.

Conversely, in conformity with the present invention, it is proposed to distribute layers 1 . . . 300 of a winding 314 according to FIG. 3, in which equal parts are designated by equal reference numerals as those indicated in FIGS. 1 and 2, in axial direction on two or more discs 315 and 316 that lie one above each other. It is particularly advantageous for both (or all) discs 315, 316 each to have substantially the same number of layers and/or windings. As shown in FIG. 3, this is realized in that disc 315, for example, has layers 1 to 150, and in that disc 316 has layers 151 to 300. In magnetic terms, it thereby results the same magnetic flux with the same current as that shown in the example according to FIG. 2. To ensure that also the cross-sectional areas of individual layers, which are decisive for dissipation, are the same areas as those in FIG. 2, without it being required to enhance the height of the magnet pole measured in axial direction, said layers 1 . . . 300 shown in FIG. 3 at least have half the height h and double the thickness d as compared to FIG. 2. Finally, a second insulation layer 317 is provided for in FIG. 3, which is arranged between the two discs 315, 316 and which electrically insulates them against each other in axial direction. The two variants according to FIG. 2 and FIG. 3, therefore, require mainly the same space. The additional insulation layer 317 enhances the construction height only insignificantly, because its thickness needs to be just a few millimeters. Hence, the so-called winding window is mainly identical in both cases.

Layers 1 to 150 of the first disc 315 and layers 151 to 300 of the second disc 316 can be wound around said core 301 in the same or opposite sense of winding. With an equally directed sense of winding, an electrical connection for the layers would have to be provided immediately at said core 301, and additionally it would be necessary to provide a connection between the $150^{th}$ layer and $151^{st}$ layer. While it is constructively expensive, it is not desired either for electrical considerations, because connections lying inside mostly involve sharp edges and tips that may entail non-desired electrical breakthroughs and damage to the innermost insulation layer and/or winding carrier 303, unless additional insulation measures are taken.

In accordance with the present invention, it is furthermore envisaged to provide for an opposite direction of winding for the conductor strips 306 (FIG. 1) in both discs 315, 316, i.e. to wind layers 1 . . . 150 oppositely to layers 151 . . . 300 around said core 301 and, moreover, to electrically connect the two layers 1 and 151 lying inside at said core 301 with each other by a connecting line 318. In this case, the two radial outer layers 150 and 300 can be provided with one electrical connection 319, 320 each, thereof one serving as a lead-in line and the other one as a lead-off line for the electric current flowing through the winding 314 so that electric current flows consecutively through the individual layers, if terminal voltage is applied between connections 319, 320.

With the embodiment example described hereinabove, the second insulation layer 317 must be capable of electrically insulating the two layers 150 and 300 against each other where terminal voltage has been applied. Therefore, the thickness of each insulation layer 317 is approx. 300 times as big as the thickness of every first insulation layer 310, for the purpose of which it is naturally also possible to provide several insulation layers 317. Since the first insulation layer 310 only needs to have a thickness of approx. 15 to 25 µm if usual insulation materials are used, the required thickness of the second insulation layer 317 increases the axial space requirement only slightly, as has already been stated before. If a different allocation of existing layers to both discs 315, 316 is chosen, the thickness of the second insulation layer 317 must be chosen in an analogous manner depending on the electric voltage maximally established in operation between the different layers. In any case, the insulation layer 317 may entirely have the same thickness that orientates itself by the maximum value occurring.

Besides, the embodiment as described with reference to FIG. 3 has the benefit in that the connecting line 318 in the area of core 301 is much less critical to peak voltages than it would be if an internal electrical connection were implemented. Therefore, the winding carrier 303 can be comparably thin or be replaced with a thin insulation layer 321 (FIG. 3) wound around said core 301 and having a comparably low thermal resistance. Hence, for reasons of space demand, it is not required to develop new insulation layers for the area of said core 301 or for the space between discs 315, 316 that cause a particularly low thermal insulation in case of a high electric insulation.

Another benefit brought by the present invention lies in that the heat generated in the central areas of discs 315, 316 must flow in radial direction through far less insulation layers 310 as it would have to with a mono-disc arrangement. The maximum number of insulation layers 310 to be flown through amounts to 75 rather than 150 as up to now for central layers 75 and 225, respectively. In axial direction, the thermal resistance remains mainly unaffected, because the heat would dissipate only axially towards the outside for reasons of symmetry, even if the second insulation layer 317 is missing, as has been schematically indicated by arrows additionally drawn in FIG. 3, and which is the reason why the insulation layer 317 lies in a thermally irrelevant marginal range.

The present invention is not limited to the embodiments described that can be varied in a multitude of ways. In particular, it would be conceivable to compose the magnet pole of three discs or more, which would then have accordingly less layers. Accordingly, in conformity with the maximum voltages thus resulting, the second insulation layers 317 lying between various layers could be thinner than those described in the embodiment of FIG. 3 so that the dissipation of heat from central discs arranged between two discs lying axially outside is not prevented completely in axial direction either. From a mere mathematical point of view, the statements made with regard to space demand and electromagnetic variables are valid in a same manner as for magnet poles composed of two discs.

Irrespective thereof, the variables indicated for the number of existing layers and discs, the indicated materials, and the method of production for the magnet pole explained with reference to FIG. 1 just constitute mere examples that can be varied in a multitude of ways. In particular it is considered self-evident that the different features can also be applied in combinations other than those shown and described hereinabove.

The invention claimed is:

1. A magnetic pole for magnetic levitation vehicles, comprising: a core (301) acting as a cooling element; a winding (314) applied on said core (301), said winding (314) having at least two discs (315, 316) formed by conductor strips (306) wound in several individual layers (1 . . . 300) around said core (301); first insulation layers (310, 321) for electrically insulating said individual layers (1 . . . 300) radially against each other and against said core (301); and at least a second insulation layer (317) lying between said at least two discs (315, 316) for electrically insulating said discs (315, 316) axially against each other, and wherein the conductor strips (306) of one disc are wound in an opposite sense with respect to the conductor strips of a neighboring disc around the core (301) and electrically connected to each other at said core (301) by way of a connecting line (318).

2. A magnetic pole according to claim 1, wherein the radial outermost layers (150, 300) are provided with electrical connections (319, 320).

3. A magnetic pole according to claim 1, wherein the two discs (315, 316) have the same number of layers (1 to 150 and/or 151 to 300).

4. A magnetic pole according to claim 1, wherein the second insulation layer (317) has a continuous thickness that is chosen depending on the voltage maximally occurring between two layers of both discs (315, 316).

5. A magnetic pole according to claim 1, wherein the radially innermost layers (1, 151) of said discs (315, 316) are electrically insulated against said core (301) by way of an insulation layer (321) wound around said core (301).

6. A magnetic pole for magnetic levitation vehicles, comprising: a core (301) acting as a cooling element; a winding (314) applied on said core (301), said winding (314) having at least two discs (315, 316) formed by conductor strips (306) wound in several individual layers (1 . . . 300) around said core (301); first insulation layers (310, 321) for electrically insulating said individual layers (1 . . . 300) radially against each other and against said core (301); and at least a second insulation layer (317) lying between said at least two discs (315, 316) for electrically insulating said discs (315, 316) axially against each other, and
wherein said individual layers (1 . . . 300) have half a height (h) and twice a thickness (d) as compared with a magnetic pole having only one disc but substantially a same magnetic flux and space requirement.

7. A magnetic pole having improved heat exchange for magnetic levitation vehicles, comprising: a core (301) acting as a cooling element; a winding (314) applied on said core (301), said winding (314) having at least two discs (315, 316) formed by conductor strips (306) wound in several individual layers (1 . . . 300) around said core (301); first insulation layers (310, 321) for electrically insulating said individual layers (1 . . . 300) radially against each other and against said core (301); and at least a second insulation layer (317) lying between said at least two discs (315, 316) for electrically insulating said discs (315, 316) axially against each other.

8. A magnetic pole for magnetic levitation vehicles, comprising a core (301) acting as a cooling element and having applied thereon a winding (314) with at least two discs (315, 316) formed by conductor strips (306) wound in several individual layers (1 . . . 300) around said core (301); first insulation layers (310, 321) for electrically insulating said individual layers (1 . . . 300) radially against each other and against said core (301); and at least a second insulation layer (317) lying between said at least two discs (315, 316) for electrically insulating said discs (315, 316) axially against each other, so that the magnetic pole has improved heat discharge for a magnetic levitation vehicle.

* * * * *